United States Patent [19]

Oh

[11] Patent Number: 5,235,480
[45] Date of Patent: Aug. 10, 1993

[54] ACTUATING DEVICE FOR A DRIVE SWITCH OF A FRONT-LOADING TYPE VCR

[75] Inventor: Taek S. Oh, Seoul, Rep. of Korea

[73] Assignee: Goldstar Co., Ltd., Seoul, Rep. of Korea

[21] Appl. No.: 633,949

[22] Filed: Dec. 26, 1990

[30] Foreign Application Priority Data

Dec. 28, 1989 [KR] Rep. of Korea ............... 20121/1989

[51] Int. Cl.$^5$ .............................................. G11B 5/008
[52] U.S. Cl. ..................................... 360/96.5; 360/93
[58] Field of Search ............... 360/96.5, 96.6, 99.02, 360/99.03, 99.06, 99.07, 93; 242/198

[56] References Cited

U.S. PATENT DOCUMENTS

| | | | |
|---|---|---|---|
| 4,642,714 | 2/1987 | Miyamoto | 360/96.5 |
| 4,661,867 | 4/1987 | Tsubota | 360/96.5 |
| 4,745,298 | 5/1988 | Iwamatsu | 307/40 |
| 4,772,970 | 9/1988 | Sato et al. | 360/96.5 |
| 4,913,025 | 4/1990 | Nakano | 84/711 |
| 4,918,549 | 4/1990 | Katono et al. | 360/96.5 |

*Primary Examiner*—Stuart S. Levy
*Assistant Examiner*—Jefferson Evans

[57] ABSTRACT

An actuating device for a drive switch for use in a front-loading type video cassette tape recorder which includes a worm, a wheel gear having a connecting gear, a drive gear, a cam portion having slant surfaces formed on one side surface of the drive gear, and a tact switch having a contact protrusion which contacts the cam portion of the drive gear, whereby the tact switch is actuated by the rotation of the drive gear.

1 Claim, 3 Drawing Sheets

ACTUATING DEVICE FOR A DRIVE SWITCH OF A FRONT-LOADING TYPE VCR

BACKGROUND OF THE INVENTION

1. Field of the Invention

The present invention relates to a drive switch for use in a front-loading type video cassette tape recorder (hereinafter "VCR") and more particularly, to an actuating device for a drive switch for use in a front-loading type VCR, which is structured with an arcuate protrusion as a cam portion which is formed on one side surface of a drive gear for transferring a tape cassette so that the cam portion directly actuates the drive switch.

2. Description of the Prior Art

Various types of drive switches for use in a front-loading type video cassette tape recorders are well known in the art. One conventional drive switch for use in a front-loading type VCR is illustrated in FIGS. 1 to 3. As shown in FIG. 1, guide pins 22 of a cassette holder (not shown) in which a tape cassette C is held are inserted into guide apertures 21a of brackets 21 at both sides thereof, and are inserted into guide holes 24a disposed at a projecting portion 24 of a loading gear 23, a connecting gear 27'integrally disposed with a wheel gear 27 meshed with a worm 26 of a motor 25 which is in gearing relationship with the loading gear 23, on one side surface of the loading gear 23, a pair of hooking projections 28 and 28' formed respectively, a plurality of contact terminals 31, 32, and 33 provided with wires fixed at a switch part 30 which is mounted on one side of the bracket 21 with a screw 29, respectively, and a switch separator 34 which is operated by the hooking projections 28 and 28' of the loading gear 23, which is mounted at the end portion of the intermediate contact terminal 32.

Such a conventional device operates as follows. When an eject button is pressed, the loading gear 23 rotates counterclockwise as shown in FIG. 1, and one side hooking projection 28 of the loading gear 23 presses down the switch separator 34 so that the intermediate contact terminal 32 and the lower contact terminal 31 contact to each other, whereby the cassette-ejecting condition is detected.

When the cassette C is loaded, the loading gear 23 rotates clockwise as shown in FIG. 2, the other side hooking projection 28 of the loading gear 23 pushed upward the switch separator 34 so that the intermediate contact terminal 32 contacts the upper contact terminal 33, whereby it is detected that the loading operation of the cassette is completed.

In such a conventional device, since the one side hooking projection 28 of the loading gear 23 has to press the switch separator 34 in a state that the cassette C is ejected, the switch separator 34 may be subjected to a plastic deformation in case of the cassette deck not being used for a long time, resulting in an unstable contact of the respective contact terminals 31, 32, and 33. Furthermore, due to the wires connected to the switch portion 30, assembly of the drive switch is cumbersome and since the width of deck mechanism is larger, it impairs the slimness of the deck mechanism.

SUMMARY OF THE INVENTION

Accordingly, it is an object of the present invention to provide an improved actuating device for a drive switch for use in a front-loading type VCR which does not involve such problems encountered in the prior art device.

Another object of the present invention is to provide an improved drive switch which includes an arcuate cam portion having slant surfaces at both sides thereof for actuating a switch which is disposed on one side surface of a drive gear rotated by a driving force of a capstan motor, and a push button type tact switch, as a drive switch, which has a contact protrusion actuated by contact of the cam portion of the drive gear which is mounted on a printed circuit board fixed under the bracket so that precise contact operation of the switch is obtained and separate wires are not used in the device.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an actuating device for a drive switch for use in a front-loading type video cassette tape recorder which includes a worm, a wheel gear having a connecting gear, a drive gear, a cam portion having slant surfaces formed on one side surface of the drive gear, and a tact switch having a contact protrusion which contacts to the cam portion of the drive gear, whereby the tact switch is actuated by the rotation of the drive gear.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
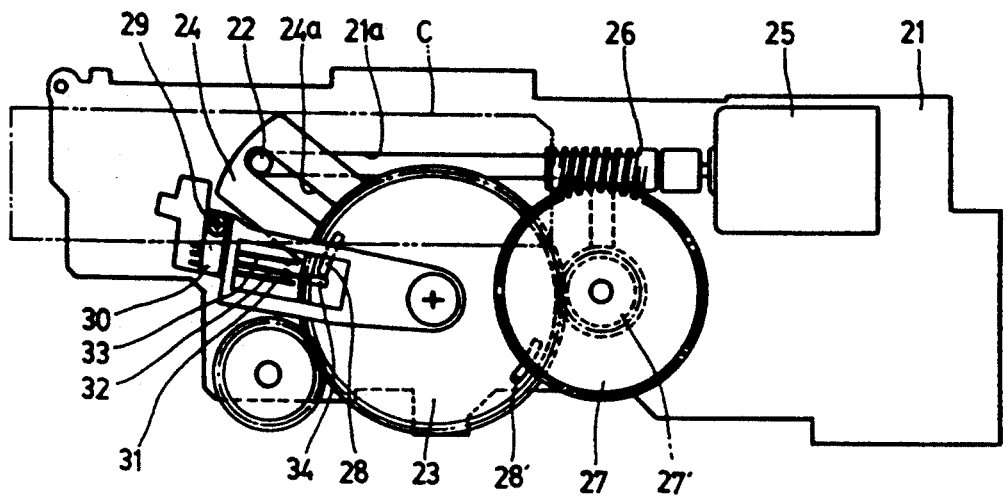
FIG. 1 is a side elevational view of a conventional actuating device illustrating a state that a tape cassette is ejected.
Figure 2:
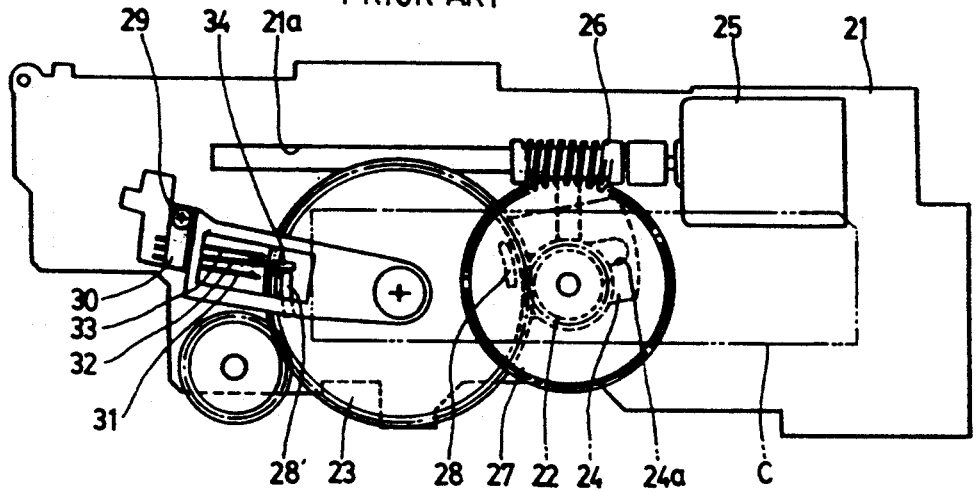
FIG. 2 is a side elevational view of the conventional actuating device illustrating a state that the tape cassette is completely loaded.
Figure 3:
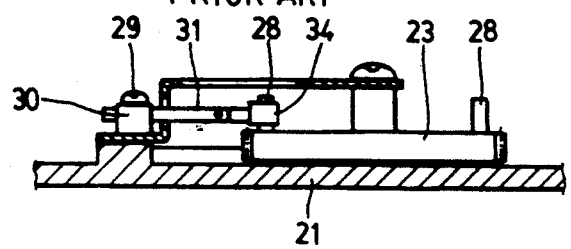
FIG. 3 is a plan view of the conventional actuating device.
Figure 4:
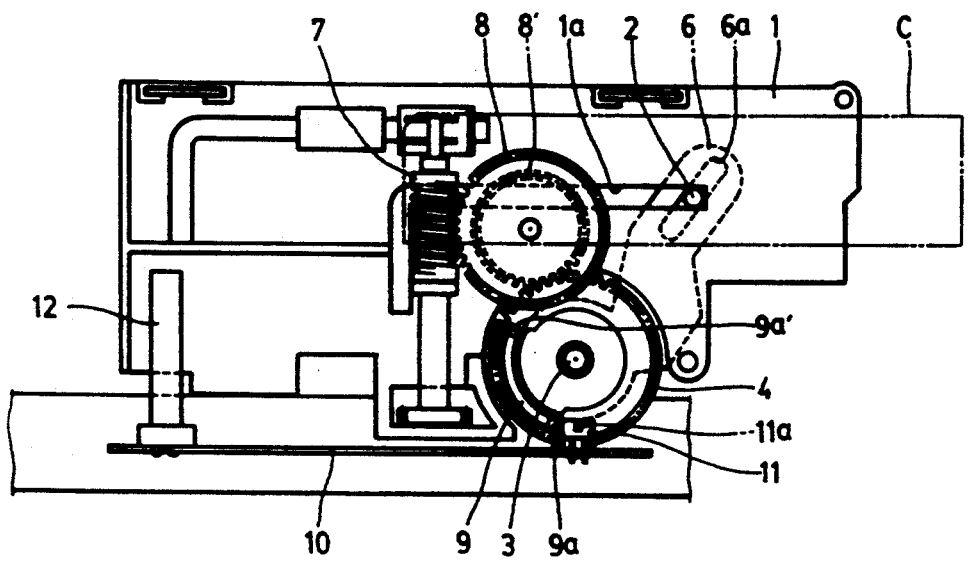
FIG. 4 is a side elevational view of the actuating device for a drive switch according to the present invention showing the state that the tape cassette is ejected.
Figure 5:
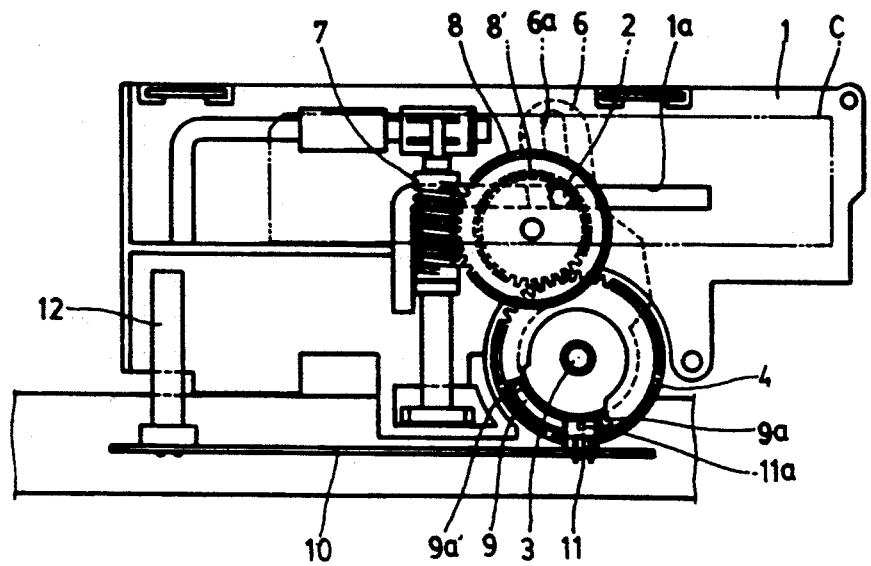
FIG. 5 is a side elevational view of the actuating device for a drive switch according to the present invention showing the state that the tape cassette is being loaded.
Figure 6:
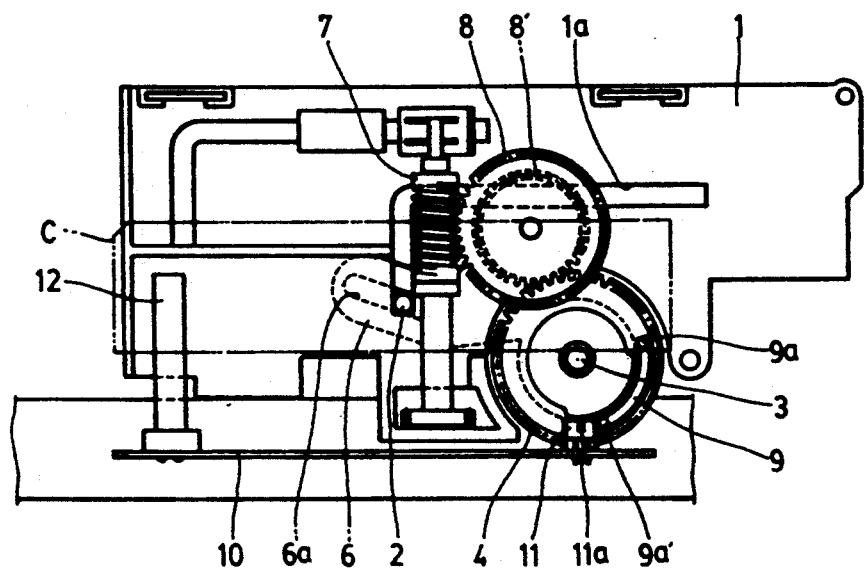
FIG. 6 is a side elevational view of the actuating device for a drive switch according to the present invention showing the state that the tape cassette is completely loaded.
Figure 7:
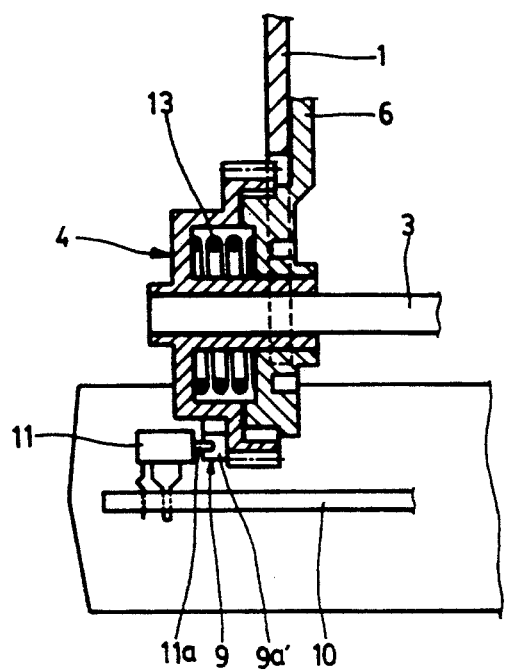
FIG. 7 is a partial sectional view showing the configuration of the device according to the present invention.

Referring now in detail to the drawings for the purpose of illustrating preferred embodiments of the present invention, the actuating device for a drive switch for use in a front-loading type VCR as shown in FIGS. 4, 5 and 6, which comprises guide pins 2 of a cassette holder to which a tape cassette C is held, which are inserted out through L-shape guide apertures 1a of a pair of brackets 1 at both sides (only one side bracket is shown), a drive gear 4 resiliently supported by a coil spring 5 which is rotatably mounted to a drive shaft 3 fixed on the bracket 1, a loading gear 6 having an elongated guide hole 6a is geared with the drive gear 4 and the guide pin 2 of the cassette holder which is inserted into the guide hole 6a, and a connecting gear 8' integrally formed with a wheel gear 8 geared with a worm 7 which is rotated by driving force of a capstan motor, wherein the device further comprises an arcuate cam portion 9 having slant surfaces 9a and 9a' disposed at both sides thereof which is disposed on one side surface of the drive gear 4, and a push button type tact switch 11, as a drive switch, including a contact protrusion 11a for detecting the up/down movement of the cassette holder by being contacted by the cam portion 9 of the drive gear 4, which is mounted on a printed circuit board 10 which is fixed under the one side bracket 1. In the drawings, reference numeral 12 is an end sensor holder and reference numeral 13 is a pressing coil spring.

The actuating device for a drive switch for use in a front-loading type VCR of the present invention operates as follows.

When the tape cassette C is ejected by the clockwise rotation of the loading gear 6 and drive gear 4 as shown in FIG. 4 the slant surface 9a formed at the cam portion 9 of the drive gear 4 does not contact the contact protrusion 11a of the tact switch 11 so that the tact switch 11 is in an OFF-position, while the loading gear 6 and drive gear 4 are rotated counterclockwise and the tape cassette C is being loaded, the cam portion 9 of the drive gear 9 presses the contact protrusion 11a of the tact switch 11 so that the tact switch 11 is in an ON-position as shown in FIG. 5. As shown in FIG. 6, when the loading gear 6 and the drive gear 4 are completely rotated counterclockwise so that the loading operating is finished, the contact protrusion 11a of the tact switch 11 is separated from the slant surface 9a' formed on the cam portion 9 of the drive gear 4, so that the tact switch 11 is turned off.

As described above in detail, the actuating device of the present invention has the effect that it is possible to solve the problem of the unstable contact of conventional switch due to plastic deformation and since the wires are not used assembly is easier so that the productivity is increased and small and slim-sized product is obtained.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An actuating device for a drive switch for use in a front-loading type video tape cassette recorder, which comprises:
   a pair of brackets,
   a drive gear rotatably mounted to a drive shaft fixed on one side of said pair of brackets, said drive gear extending in a radial direction in a radial plane,
   a loading gear including an elongated guide hole and geared with said drive gear,
   a connecting gear integrally formed with a wheel gear, said connecting gear geared with a worm,
   a cam portion integrally formed as part of said drive gear wherein said cam portion extends in the radial direction and in the same radial plane as said drive gear, said cam portion including arcuate radial edges, and
   a tact switch, positioned in the same radial plane as said drive gear and said cam portion, including a contact protrusion mounted on a printed circuit board fixed under said pair of brackets for contacting said cam portion of said drive gear, whereby the tact switch is smoothly actuated by the arcuate radial edges of said cam portion driven by a rotational force applied by said drive gear.

* * * * *